US009244672B2

(12) United States Patent
Williams et al.

(10) Patent No.: US 9,244,672 B2
(45) Date of Patent: Jan. 26, 2016

(54) OPTIMIZATION UTILITY FOR DEVELOPING EMBEDDED SYSTEMS

(75) Inventors: Clark Williams, Madison, AL (US); Brendan Conoboy, Albuquerque, NM (US)

(73) Assignee: Red Hat, Inc., Raleigh, NC (US)

( * ) Notice: Subject to any disclaimer, the term of this patent is extended or adjusted under 35 U.S.C. 154(b) by 1582 days.

(21) Appl. No.: 11/607,395

(22) Filed: Nov. 30, 2006

(65) Prior Publication Data

US 2008/0128715 A1 Jun. 5, 2008

(51) Int. Cl.
*G06F 9/445* (2006.01)

(52) U.S. Cl.
CPC ... *G06F 8/64* (2013.01); *G06F 8/60* (2013.01)

(58) Field of Classification Search
None
See application file for complete search history.

(56) References Cited

U.S. PATENT DOCUMENTS

| | | | |
|---|---|---|---|
| 6,006,035 A * | 12/1999 | Nabahi | 717/175 |
| 6,182,275 B1 * | 1/2001 | Beelitz et al. | 717/175 |
| 6,249,886 B1 * | 6/2001 | Kalkunte | 714/47.3 |
| 6,457,142 B1 * | 9/2002 | Klemm et al. | 714/38.12 |
| 6,546,554 B1 * | 4/2003 | Schmidt et al. | 717/176 |
| 6,668,374 B1 * | 12/2003 | Sten et al. | 717/173 |
| 6,681,391 B1 * | 1/2004 | Marino et al. | 717/175 |
| 6,698,018 B1 * | 2/2004 | Zimniewicz et al. | 717/175 |
| 6,789,215 B1 * | 9/2004 | Rupp et al. | 714/38.14 |
| 6,836,786 B1 * | 12/2004 | Zoller et al. | 709/203 |
| 6,986,148 B2 * | 1/2006 | Johnson et al. | 719/332 |
| 7,222,341 B2 * | 5/2007 | Forbes et al. | 717/170 |
| 7,409,685 B2 * | 8/2008 | Chen et al. | 717/170 |
| 7,634,769 B2 * | 12/2009 | Han et al. | 717/168 |
| 2001/0016866 A1 * | 8/2001 | Izumi | 709/107 |
| 2001/0029605 A1 * | 10/2001 | Forbes et al. | 717/11 |
| 2003/0084435 A1 * | 5/2003 | Messer et al. | 717/174 |
| 2004/0027378 A1 * | 2/2004 | Hays et al. | 345/763 |
| 2004/0143830 A1 * | 7/2004 | Gupton et al. | 717/174 |
| 2004/0148371 A1 * | 7/2004 | Lin et al. | 709/223 |
| 2004/0244008 A1 * | 12/2004 | Lee | 719/310 |
| 2005/0160418 A1 * | 7/2005 | Jeong et al. | 717/173 |
| 2005/0216912 A1 * | 9/2005 | Cox et al. | 717/178 |
| 2005/0235281 A1 * | 10/2005 | Lefrancois | 717/175 |
| 2005/0251797 A1 * | 11/2005 | Omiya et al. | 717/165 |
| 2006/0031398 A1 * | 2/2006 | Hirao | 709/217 |
| 2006/0047720 A1 * | 3/2006 | Kulkarni et al. | 707/204 |
| 2006/0047945 A1 * | 3/2006 | Brandenberger et al. | 713/2 |
| 2006/0048138 A1 * | 3/2006 | Boctor et al. | 717/174 |
| 2007/0074200 A1 * | 3/2007 | Huang et al. | 717/168 |
| 2007/0150550 A1 * | 6/2007 | Lin et al. | 709/217 |
| 2012/0150940 A1 * | 6/2012 | Kruempelmann et al. | 709/203 |

* cited by examiner

*Primary Examiner* — Jason Mitchell
(74) *Attorney, Agent, or Firm* — Lowenstein Sandler LLP

(57) ABSTRACT

A method and apparatus for optimizing the development of an embedded system for a target device. The method may include selecting a set of packages corresponding to the class of an embedded system from various packages available for installation, and integrating the set of packages into a root file system. The method may further include receiving user input identifying at least one application to be used with the embedded system, integrating packages associated with the identified application into the root file system, and loading an image of the root file system to the target device.

17 Claims, 5 Drawing Sheets

OPTIMIZATION UTILITY FOR DEVELOPING EMBEDDED SYSTEMS

TECHNICAL FIELD

Embodiments of the present invention relate to embedded systems, and more specifically to optimizing the development of embedded systems.

BACKGROUND

An embedded system is a special-purpose system in which the computer is encapsulated by the device it controls. Devices that utilize embedded systems may include, for example, information appliances, smart phones, set-top boxes, personal digital assistants (PDAs), etc.

Embedded systems often utilize the Linux operating system because it is available as open source software. Linux was initially designed for use with personal computer systems that have a large amount of storage space available. Embedded systems, in contrast, have a limited amount of storage space. In addition, an embedded system, unlike a general-purpose computer such as a personal computer, usually performs a single predefined function having very specific requirements. Hence, in view of space constraints and cost savings, an embedded system should provide only the storage space that is required for the specified function.

When developing an embedded system, a designer typically uses a development environment on a host PC. In particular, the designer selects a set of software packages for the embedded system and copies these software packages to the host PC. The software packages may be in the Red Hat® Package Manager (RPM) format, which is a native packaging format of the Linux operating system. Each software package has its own function and operation. The designer must have a significant depth of knowledge of the software and hardware to decide which software packages need to be selected for the embedded system.

Once the selection of the software packages is completed, the designer integrates the selected software packages into a root file system, which is then compressed to an image file and loaded to a target device. The loaded image file is used to test the operation of the root file system. If the root file system operates abnormally, the designer has to spend a significant amount of time on debugging. After debugging, the designer returns to the development process.

As can be seen from the above description, the prior art method for developing embedded systems is complicated and time consuming.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
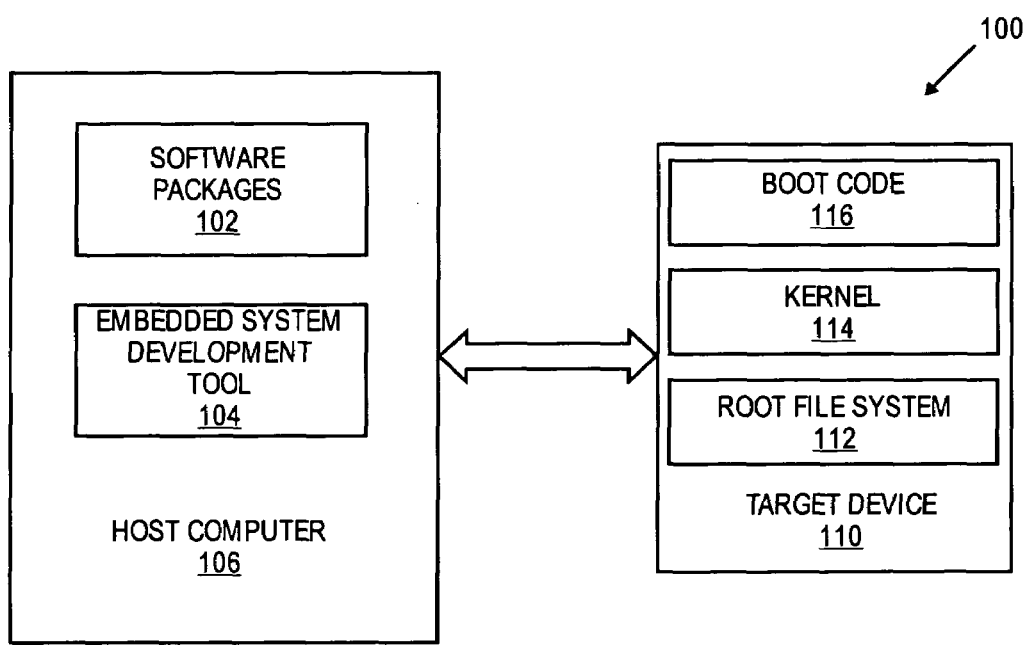
FIG. 1 is a block diagram of an exemplary system in which embodiments of the invention may be implemented.

Described herein is a method and apparatus for optimizing the development of an embedded system. In one embodiment, an embedded system development tool receives user input identifying the class of an embedded system to be developed for a target device, and selects a set of packages corresponding to the class of the embedded system from various packages available for installation. The embedded system development tool integrates the selected packages into a root file system. Next, the embedded system development tool receives user input identifying one or more applications to be used with the embedded system, and integrates packages associated with the identified applications into the root file system. Afterwards, the embedded system development tool loads an image of the resulting root file system to the target device to test the operation of the embedded system.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.), etc.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates a block diagram of an exemplary system 100 in which embodiments of the invention may be implemented. The system 100 includes a host computer 106 that provides the design environment for developing an embedded system for a target device 110. The host computer 106 may be a personal computer (PC), a server or any other machine. The host computer 106 may be coupled to the target device 110 directly (e.g., via a cable) or via a network (e.g., a public or private network). The target device 110 may be an information appliance, a smart phone, a set-top box, a personal digital assistant (PDA), a network appliance, etc.

The host computer 106 may store, or have access to, various software packages 102 available for installation on the target device. The software packages 102 pertain to a specific operating system (e.g., Linux, Windows, Solaris, OS-X, IRIX, HP-UX, etc.) and can be in a native package format of this operating system or they can be in some arbitrary format. Examples of package formats include Red Hat® Package Manager (RPM) format packages, Itsy Package Management System (IPKG) format, Debian Package (DEB) format, Windows Installer (MSI) package format, Solaris datastream package (PKG) format, etc. Software packages may include source code, executable files, support files and shared libraries that may be used by the operating system and various applications. The number, type and contents of software packages differ between oftware package formats. For example, the RPM and IPKG packages used on Linux may include packages with manual pages to allow user interaction with the operation of the system, packages with locale information for different languages to be used during the operation of the system, packages for different device drivers, etc.

In one embodiment, the host computer 106 contains an embedded system development tool 104 that designs the embedded system for the target device 110. In particular, the tool 104 selects a set of packages from software packages 102 that corresponds to the class of the embedded system (e.g., information appliance, smart phone, set-top box, PDA, network appliance, etc.) and integrates this set into a root file system. In addition, the tool 104 may identify one or more applications desired by a system designer to run on the target device 110, and integrate software packages of these applications into the root file system. The tool 104 may then compress the resulting root file system to an image and load the image of the root file system to the target device 110. This image of the root file system (root file system 112) may be stored in non-volatile memory (e.g., flash memory or ROM) of the target device 110, together with kernel 114 (e.g., Linux) and boot code 116 that controls the loading of the kernel 114.

The tool 104 may provide a user interface (UI) that allows the system designer to interact with the development process and to provide various information pertaining to the embedded system. This information may include, for example, the class of the embedded system, the applications to be installed, the language to be used by a user of the embedded system, etc.

In one embodiment, the tool 104 also receives input of the system designer on how to start the application during the operation of the embedded system. For example, the designer input may specify that the application should start right after the system is initialized or when a specific event occurs during the operation of the embedded system. In response, the tool 104 creates a script (e.g., a shell script) for starting the application and loads this script to the non-volatile memory of the target device 110. During the operation of the embedded system, the script will pass a command to the operating system to start the application when a predefined condition is satisfied (e.g., upon system initialization or in response to a specific event).

Accordingly, the tool 104 automates the process of developing an embedded system, making it efficient and easy to perform. As compared to prior art, the designer utilizing the tool 104 no longer needs to have significant depth of specific domain knowledge of the software and hardware, and can design the embedded system in a relatively short period of time.

Figure 2:
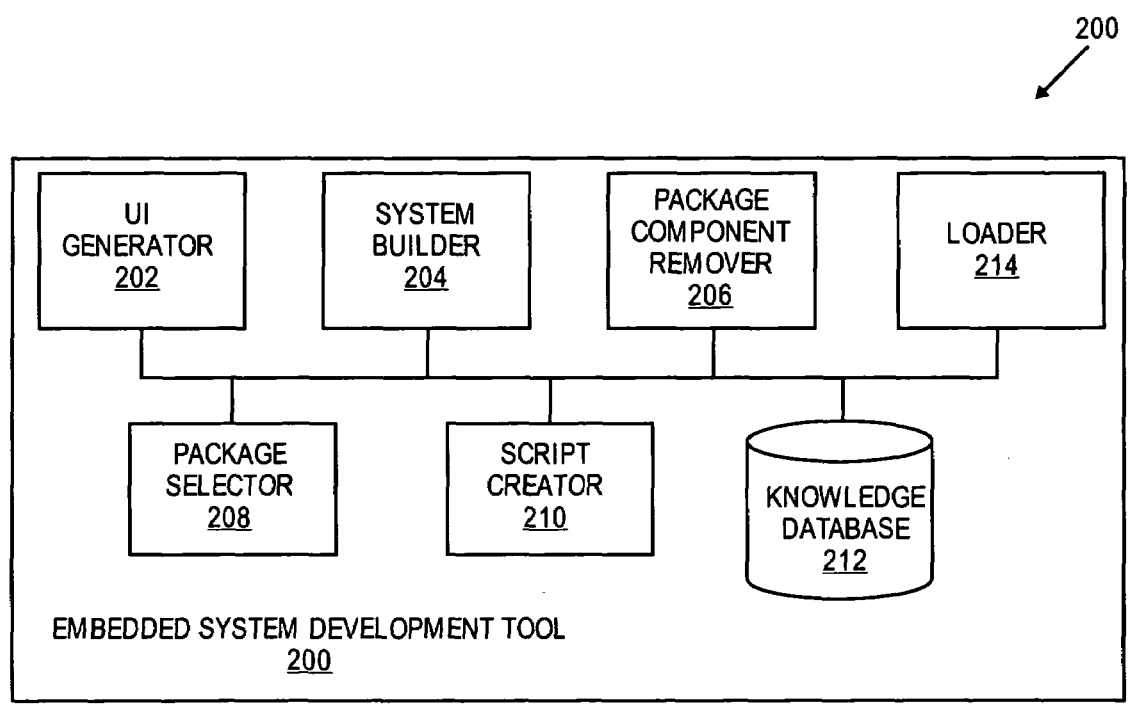
FIG. 2 is a block diagram of one embodiment of an embedded system development tool.

FIG. 2 is a block diagram of one embodiment of an embedded system development tool 200. The tool 200 includes a UI generator 202, a system builder 204, a package component remover 206, a loader 214, a package selector 208, a script creator 210, and a knowledge database 212.

The UI generator 202 provides a UI interface facilitating designer input of information pertaining to an embedded system being developed. This information may include, for example, the class of the embedded system, the applications to be installed, the language to be used by a user of the embedded system, etc.

The package selector 208 identifies the class of the embedded system and selects software packages corresponding to this class. For example, if the embedded system is a PDA, the package selector 208 will select a package for a display driver. Alternatively, the embedded system is a set-top box, the package selector 208 will not select the display driver package. In one embodiment, the package selector 208 consults the knowledge database 212 that provides information on the packages that are required for specific classes of embedded systems.

The system builder 204 is responsible for integrating the selected packages into a root file system. In addition, the system builder 204 may identify (based on the designer input) one or more applications to be installed on the embedded system, and integrate software packages of these applications into the root file system. In one embodiment, the system builder 204 also defines the structure of the root file system and places the packages of the applications at specific locations within the root file system. The system builder 204 may automatically determine the location of these packages or it may ask the system designer to specify the location.

The package component remover 206 removes, from the resulting root file system, package components that are not strictly required for the operation of the embedded system. Such package components may include manual pages, unneeded locales, unneeded device drivers, etc. In addition, the package component remover 206 may perform a shared library dependency analysis on all executable files in the root file system and remove all shared libraries that are not referenced. In one embodiment, prior to removing a package component, the package remover 206 consults the knowledge database 212 that contains information on package components that must be present in the root file system. This information might have been collected based on prior operation of other embedded systems. The knowledge database 212 may be updated each time an embedded system operates abnormally due to the absence of a specific package component from the root file system. The knowledge database 212 may be part of the tool 200 or be accessible to the tool 200 via a network (e.g., public network or private network).

The script creator 210 identifies the system designer preferences with respect to starting the application (e.g., upon system initialization or in response to a specific event), and creates a script (e.g., a shell script) to pass to the operating system a command to start the application at the desired time.

The loader 214 is responsible for loading the root file system to the target device. In addition, the loader 214 may also load to the target device the script generated by the script creator 210.

Figure 3:
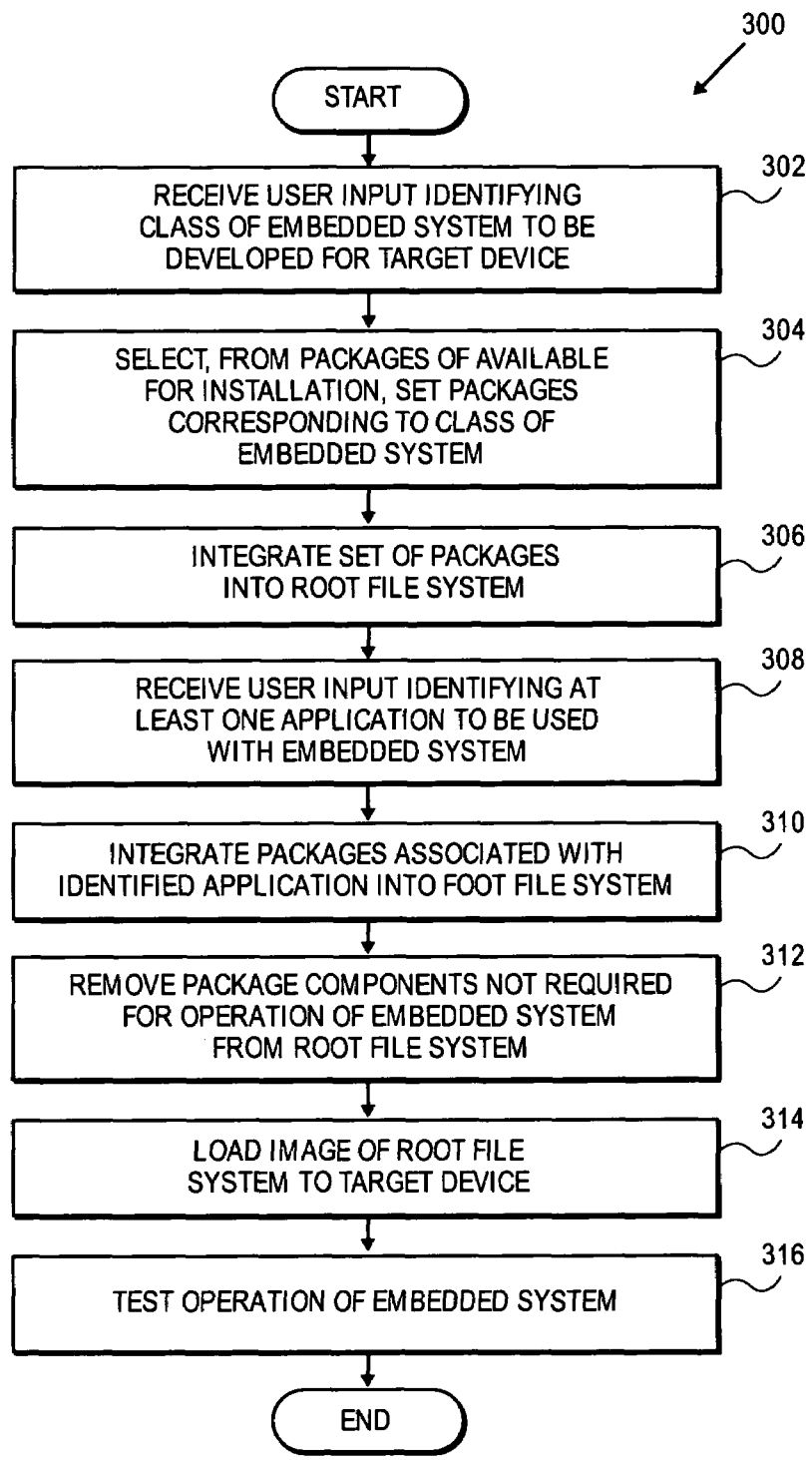
FIG. 3 is a flow diagram of one embodiment of a method for developing an embedded system.

FIG. 3 is a flow diagram of one embodiment of a method 300 for developing an embedded system. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, method 300 is performed by an embedded system development tool 104 of host computer 106 of FIG. 1. Alternatively, method 300 may be performed by some other device.

Referring to FIG. 3, method 300 begins with processing logic receiving user input that identifies the class of an embedded system to be developed for a target device (block 302). The class may include, for example, a set-top box, a smart phone, a PDA, a network appliance, etc. Alternatively, or in addition, classes may be defined based on considerations of technical constraints such as available storage space on the target device, available peripheral devices on the target device, the CPU architecture of the target device (e.g., Advanced RISC Machine (ARM), i386, etc.), etc.

At block 304, processing logic selects a set of packages corresponding to the class of the embedded system from various packages available for installation. For example, an embedded system of a set-top box may not need display driver packages, an embedded system without network capabilities may not need networking packages, an embedded system with little storage space available may disallow the use of larger packages, etc. The packages may be in a native packaging format of the operating system used with the embedded system. For example, the packages used with Linux may be in the RPM or IPKG format, the packages used with Solaris may be in the Solaris datastream package format, etc. Alternatively, packages may be in an arbitrary format not related to the operating system. For example, the Solaris datastream package may be used with Linux files, etc. In addition, packages can be converted from one format to another during the development of the embedded system (e.g., RPM packages may be converted into the IPKG format and vice versa). The packages may include source code, executable files, support files, shared libraries, etc. In addition, packages may include programs to execute (a program may be executed when a packages is installed or uninstalled). In one embodiment, processing logic consults a knowledge database to determine which packages to select for the specified class of the embedded system.

At block 306, processing logic integrates the selected packages into a root file system. In one embodiment, processing logic defines the structure of the root file system based on the selected packages and a template file system selected from a collection of templates based on the estimated size of the root file system, the intended number of file systems on the embedded system, and other parameters.

At block 308, processing logic receives user input identifying one or more applications to be run on the embedded system. In response, processing logic determines the location of the applications' packages in the root file system and integrates the application packages into the root file system (block 310). In one embodiment, processing logic asks the user to specify the location for the application packages within the root file system. Alternatively, processing logic determines the location automatically (e.g., based on a template file system containing the same or similar application packages). Processing logic may or may not notify the user about the determined location and ask for confirmation.

At block 312, processing logic removes package components that are not strictly required for the operation of the embedded system. Such package components may include manual pages, unneeded locales, unneeded device drivers, etc. In addition, processing logic may perform a shared library dependency analysis on all executable files in the root file system and remove all shared libraries that are not referenced. In one embodiment, prior to removing a package component, processing logic consults the knowledge database that contains information on package components that must be present in the root file system.

At block 314, in one embodiment, processing logic loads an image of the root file system to the target device. Alternatively, processing logic may load the root file system onto a simulated target device that may be part of the host computer or some other device.

At block 316, processing logic tests the operation of the embedded system. If the embedded system operates abnormally due the absence of a specific package component, processing logic integrates the specific package component into the root file system, generates a new image of the root file system, and loads the image to the target device. In addition, in one embodiment, processing logic also updates the knowledge database based on the detected error.

Figure 4:
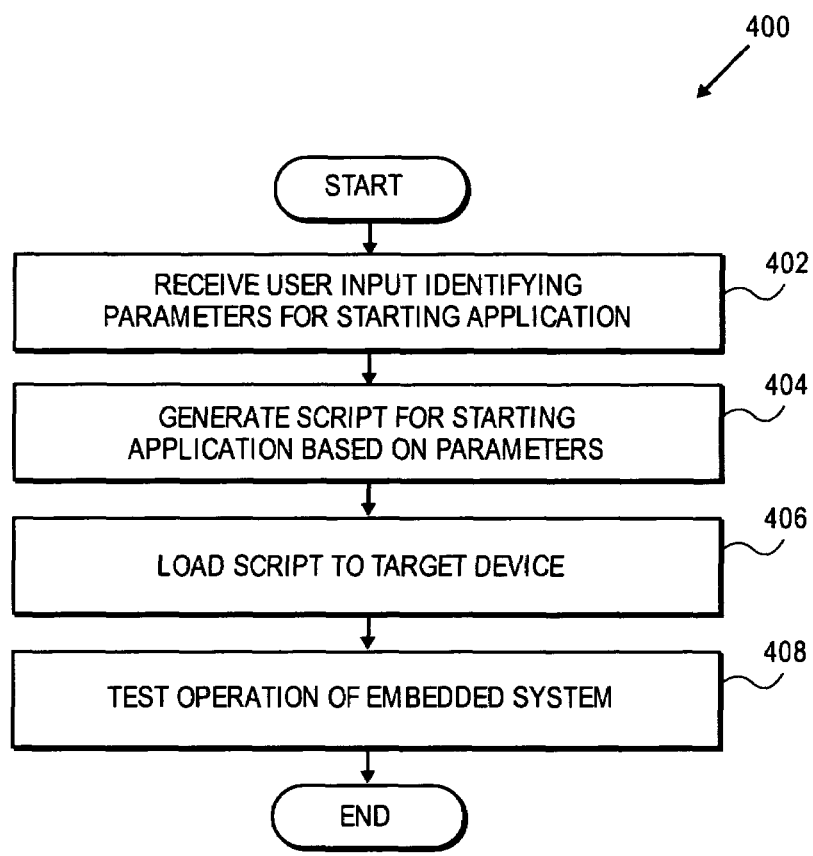
FIG. 4 is a flow diagram of one embodiment of a method for automatically starting an application during the operation of an embedded system.

FIG. 4 is a flow diagram of one embodiment of a method 400 for automatically starting an application during the operation of an embedded system. The method may be performed by processing logic that may comprise hardware (e.g., circuitry, dedicated logic, programmable logic, microcode, etc.), software (such as instructions run on a processing device), or a combination thereof. In one embodiment, method 400 is performed by an embedded system development tool 104 of FIG. 1.

Referring to FIG. 4, method 400 begins with processing logic receiving user input identifying parameters for starting an application to be installed on the embedded system (block 402). These parameters may be received once the user specifies the application that should run on the embedded system. The parameters may require, for example, that the application start once the initialization of the system completes or in response to a specific event.

At block 404, processing logic generates a script (e.g., a shell script) for starting the application based on the parameters specified by the user. At block 406, processing logic loads the script to the target device. In one embodiment, processing logic loads the script together with the image of the root file directory.

At block 408, processing logic tests the operation of the embedded system, including the operation that pertains to the start of the application.

Figure 5:
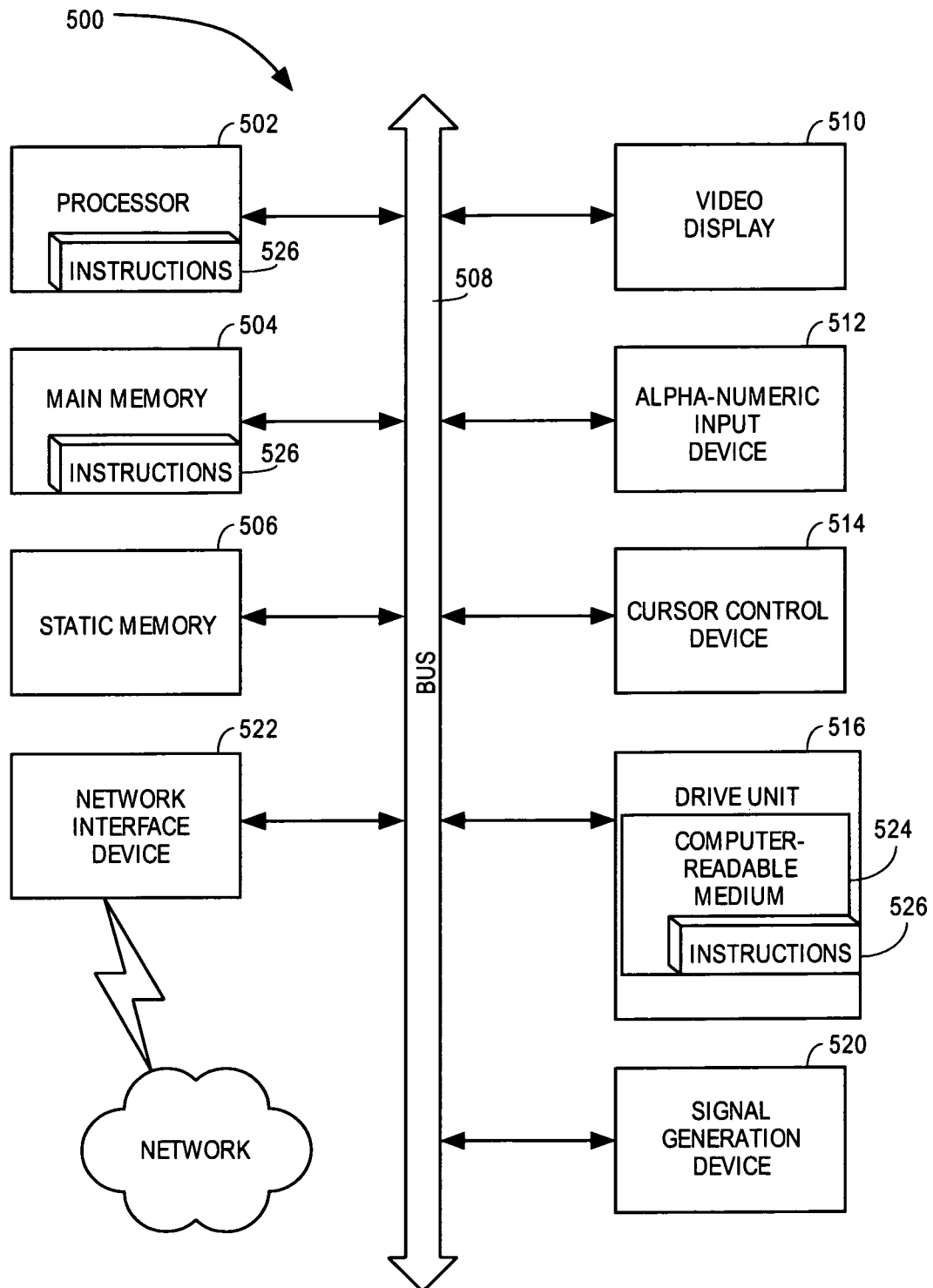
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. The machine may be connected (e.g., networked) to other machines in a LAN, an intranet, an extranet, or the Internet. The machine may operate in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein. The machine may be a server, a personal computer, a mobile device, or any other device.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), and a static memory 506 (e.g., flash memory, static random access memory (SRAM), etc.), which may communicate with each other via a bus 508. Alternatively, the processing device 502 may be connected to memory 504 and/or 506 directly or via some other connectivity means.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 502 is configured to execute processing logic 526 for performing the operations and steps discussed herein.

The computer system 500 may further include a network interface device 522. It also may include a video display unit 510 (e.g., a liquid crystal display (LCD) or a cathode ray tube (CRT)), an alphanumeric input device 512 (e.g., a keyboard), a cursor control device 514 (e.g., a mouse), and/or a signal generation device 520 (e.g., a speaker). Although not shown, the computer system 500 may also include a pen digitizer and/or pen or stylus. The digitizer may be apart from the video display unit 510 or co-extensive with the display area of the display unit 510. Further, the digitizer may be integrated in the display unit 510, or may exist as a separate device overlaying or otherwise appended to the display unit 510.

The computer system 500 may also include a data storage device 516 having a machine-accessible storage medium 524 on which is stored one or more sets of instructions (e.g., software 526) embodying any one or more of the methodologies or functions described herein. The software 526 may also reside, completely or at least partially, within the main memory 504 and/or within the processing device 502 during execution thereof by the computer system 500, the main memory 504 and the processing device 502 also constituting machine-accessible storage media. The software 526 may further be transmitted or received over a network via the network interface device 522.

While the machine-accessible storage medium 524 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
   providing, by a tool running on a host computer system, a user interface facilitating user input identifying a class of an embedded system to be developed for a target device, wherein the class of the embedded system comprises one of a set-top box, a network appliance, a handheld device, or a mobile phone;
   receiving, via the user interface, a user-identified class of the embedded system to be developed for the target device;
   accessing, by the tool, a knowledge database that stores information specifying sets of packages for different classes of embedded systems to determine a set of packages for the user-identified class of the embedded system, the information in the knowledge database being collected in view of prior operation of the embedded systems of the different classes;
   selecting, from a plurality of packages available for installation, the set of packages for components of the embedded system of the user-identified class, the selecting being performed by the tool based on the knowledge database, without user input identifying domain requirements of the user-identified class of the embedded system;
   integrating the set of packages into a root file system;
   upon receiving user input identifying at least one application to be used with the embedded system, integrating one or more packages associated with the identified application within the root file system;
   identifying, based on the knowledge database, package components to be removed from the root file system in view of the identified application;
   modifying the root file system by deleting the identified package components, wherein an image of the modified root file system is to be loaded to the target device; and
   in response to determining that operation of the embedded system ends abnormally due to absence of a particular package from the modified root file system, integrating, by a processing device executing the tool, the particular package into the modified root file system, and updating the knowledge database to add the particular package to the set of packages for the user-identified class of the embedded system.

2. The method of claim 1 further wherein integrating the packages associated with the identified application further comprises:
   finding a location within the root file system for the packages associated with the identified application.

3. The method of claim 1 wherein integrating the packages associated with the identified application further comprises:
   selecting a template file system from a plurality of templates in view of an estimated size of the root file system;
   defining a structure of the root file system based on the set of packages and the template file system;
   presenting the structure of the root file system to a user; and
   requesting the user to specify a location within the root file system for the packages associated with the identified application.

4. The method of claim 1 further comprising:
   upon receiving user input indicating one or more parameters for starting execution of the identified application on the target device, generating a script for starting the execution of the application in view of the parameters;

loading the script to the target device; and
testing an operation of the embedded system.

5. The method of claim 1 further comprising:
creating the image of the modified root file system after integrating the particular package into the modified root file system.

6. The method of claim 5 wherein identifying the package components to be removed comprises:
consulting the knowledge database prior to removing package components from the root file system.

7. The method of claim 1 wherein the package components to be removed comprise one or more of unneeded manual pages, unneeded locales, or unneeded device drivers.

8. The method of claim 1 wherein identifying the package components to be removed comprises:
identifying shared libraries that are not referenced by executable files within the root file system.

9. The method of claim 1 wherein the selecting, the integrating of the set of packages, the identifying, the modifying, and the integrating of the particular package are performed without user interaction.

10. The method of claim 1 wherein an operating system of the embedded system is Linux, and the plurality of packages are in an RPM or an IPKG format.

11. A non-transitory machine-accessible medium including data that, when accessed by a processing device, cause the processing device to perform a method comprising:
providing, by a tool running by the processing device on a host computer system, a user interface facilitating user input identifying a class of an embedded system to be developed for a target device, wherein the class of the embedded system comprises one of a set-top box, a network appliance, a handheld device, or a mobile phone;
receiving, via the user interface, a user-identified class of the embedded system to be developed for the target device;
accessing, by the tool, a knowledge database that stores information specifying sets of packages for different classes of embedded systems to determine a set of packages for the user-identified class of the embedded system, the information in the knowledge database being collected in view of prior operation of the embedded systems of the different classes;
selecting, from a plurality of packages available for installation, the set of packages for components of the embedded system of the user-identified class, the selecting being performed by the tool based on the knowledge database, without user input identifying domain requirements of the user-identified class of the embedded system;
integrating the set of packages into a root file system;
upon receiving user input identifying at least one application to be used with the embedded system, integrating one or more packages associated with the identified application within the root file system;
identifying, based on the knowledge database, package components to be removed from the root file system in view of the identified application;
modifying the root file system by deleting the identified package components, wherein an image of the modified root file system is to be loaded to the target device; and
in response to determining that operation of the embedded system ends abnormally due to absence of a particular package from the modified root file system, integrating the particular package into the modified root file system, and updating the knowledge database to add the particular package to the set of packages for the user-identified class of the embedded system.

12. The machine-accessible medium of claim 11 wherein integrating the packages associated with the identified application comprises:
finding a location within the root file system for the packages associated with the identified application.

13. The machine-accessible medium of claim 11 wherein the method further comprises:
testing the execution of the identified application during an operation of the embedded system.

14. The machine-accessible medium of claim 11 wherein the method further comprises:
creating the image of the root file system after removing the package components.

15. An apparatus comprising:
a memory; and
a processing device, coupled to the memory, to cause:
a user interface to facilitate user input identifying a class of an embedded system to be developed for a target device, wherein the class of the embedded system comprises one of a set-top box, a network appliance, a handheld device, or a mobile phone, wherein the user interface is further to receive a user-identified class of the embedded system to be developed for the target device;
a knowledge databases to store information specifying sets of packages for different classes of embedded systems;
and wherein the processing device is further to:
access the knowledge database to determine a set of packages for the user-identified class of the embedded system, the information in the knowledge database being collected in view of prior operation of the embedded systems of the different classes;
select, from a plurality of packages available for installation, the set of packages for components of the embedded system of the user-identified class, wherein the package selector selects the set if packages based on the knowledge database without user input identifying domain requirements of the user-identified class of the embedded system;
integrate the set of packages into a root file system;
identify at least one application to be used with the embedded system;
integrate one or more packages associated with the identified application within the root file system;
identify, based on the knowledge database, package components to be removed from the root file system in view of the identified application, and to modify the root file system by deleting the identified package components, wherein an image of the modified root file system is to be loaded to the target device; and
in response to determining that operation of the embedded system ends abnormally due to absence of a particular package from the modified root file system, integrate the particular package into the modified root file system, and update the knowledge database to add the particular package to the set of packages for the user-identified class of the embedded system.

16. The apparatus of claim 15 further comprising a loader operable to load an image of the root file system to the target device.

17. The apparatus of claim 15 wherein the knowledge database is to store data identifying package components to be present in the root file system.

* * * * *